(No Model.)
G. T. LEWIS.
APPARATUS FOR GRINDING SUBSTANCES AND MIXING THE SAME WITH LIQUIDS.
No. 270,904. Patented Jan. 23, 1883.
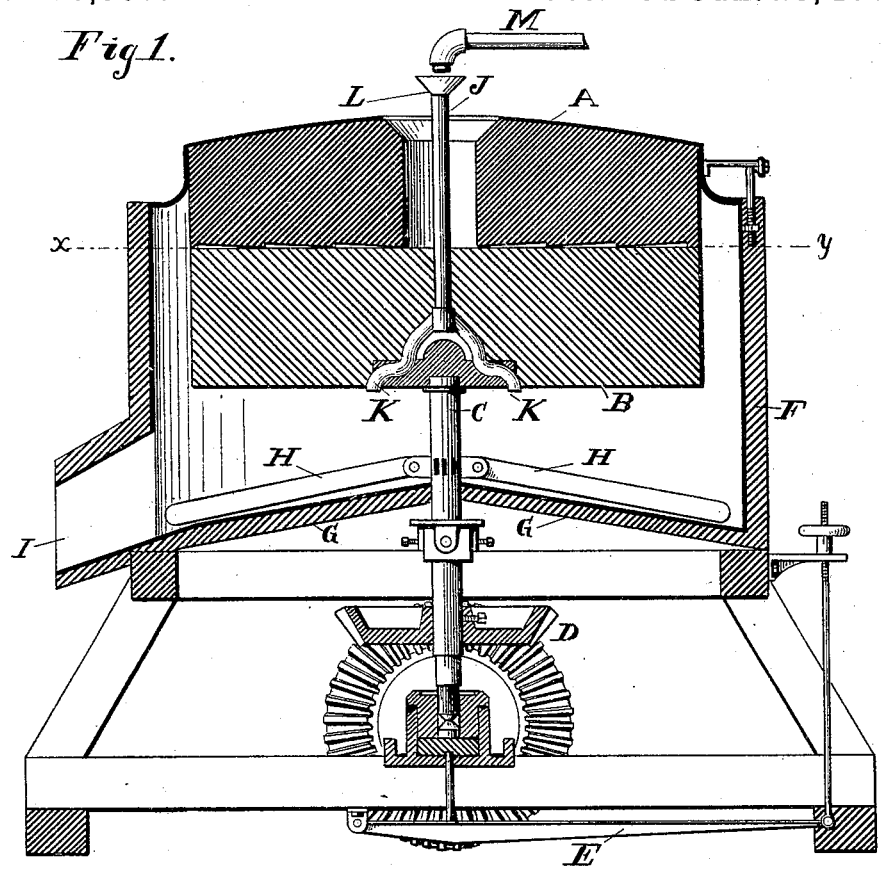
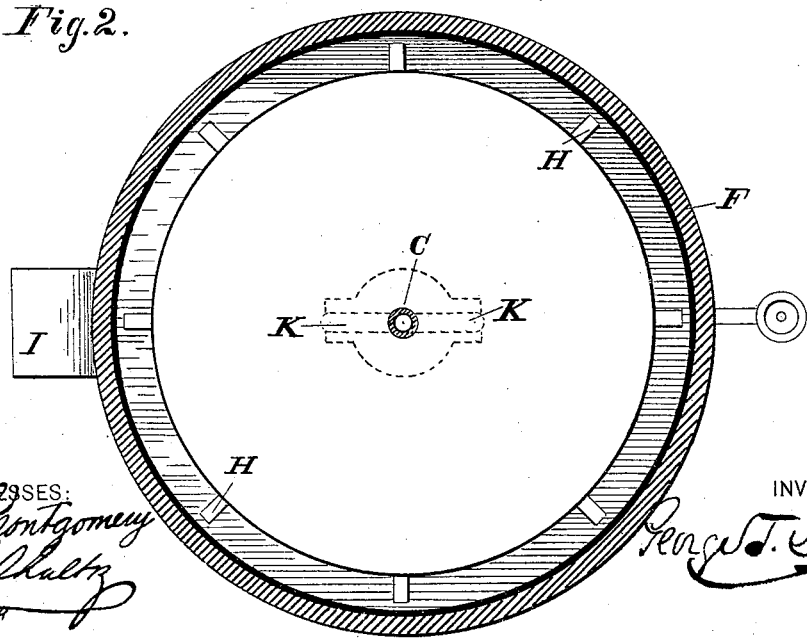
WITNESSES:
INVENTOR

UNITED STATES PATENT OFFICE.

GEORGE T. LEWIS, OF PHILADELPHIA, PENNSYLVANIA, ASSIGNOR TO THE UNITED STATES CHEMICAL COMPANY, OF CAMDEN, NEW JERSEY.

APPARATUS FOR GRINDING SUBSTANCES AND MIXING THE SAME WITH LIQUIDS.

SPECIFICATION forming part of Letters Patent No. 270,904, dated January 23, 1883.

Application filed July 27, 1882. (No model.)

*To all whom it may concern:*

Be it known that I, GEORGE T. LEWIS, of the city of Philadelphia, State of Pennsylvania, have invented an Improved Apparatus for Grinding Substances and Mixing the Same with Liquids, of which the following is a specification.

The object of my invention is to provide means for supplying liquid to ground material in such manner that by the action of the apparatus the said liquid and ground material shall become thoroughly and quickly mixed together; and said invention consists as hereinafter described and claimed.

In the drawings, Figure 1 is a vertical central view, partly in section and partly in elevation, of my improved apparatus; and Fig. 2 is a sectional plan view on the line $x\,y$ of Fig. 1, in which—

A is the upper stationary grinding-stone; B, the lower revolving grinding-stone, supported upon and operated by the central driving spindle or shaft, C, which latter is driven by gearing D, and is provided with means, E, for vertically adjusting the lower grinding-stone, B.

F is a lead-lined casing, surrounding the stones. This casing is provided with a lead-lined floor, G, which slopes downwardly from the central spindle, C, toward the walls of the casing F.

H H are arms or mixers pivoted to the spindle C and actuated thereby, and I is an opening through which the ground and mixed material is discharged.

The apparatus above described is of usual and well-known construction. I provide a liquid-supplying pipe, J, which passes through, is attached to, and is revolved by the lower grinding-stone, B. This pipe terminates at its lower extremity in discharging arms or pipes K K, opening downwardly into the space below said lower stone, said arms being adapted to discharge liquid upon the floor G. The pipe J, at its upper end, is provided with a funnel-shaped mouth, L, adapted to receive liquid from a feed-pipe, M.

I do not confine myself to the number of discharge-pipes K K employed, nor to any given distance or distances at which from the central spindle, C, said arms shall be located.

Such being the construction of my apparatus, its mode of operation will be readily understood—that is to say, the ground material falls from the periphery of the stones upon the floor G. Upon this floor the liquid from the pipes K K is likewise caused to fall; there, by the revolving action of the mixers H H, a thorough and rapid mixing of said articles is caused to take place.

I am aware that machines for grinding substances and mixing the ground material with liquids have been employed, in which the liquid was discharged or fed into the machine outside the periphery of the grinding-stone. In my apparatus the liquid is fed to the machine within the periphery of the grinding-stones beneath the same upon the grinding-floor G. The advantage of my arrangement of parts is that the ground material with which, during the operation of grinding, the floor G is covered, is, upon said floor, by means of the arms or mixers H, thoroughly mixed with said liquid, whereas in the apparatus heretofore in use the arms H acted to sweep the dry ground material from that part of the floor which is beneath the grinding-stones to its periphery before the liquid could come into contact with the ground material.

Having thus described my invention, I claim—

1. In combination, grinding mechanism, mixing mechanism located beneath the same, and a liquid-supplying pipe constructed and arranged to discharge liquid beneath and within the periphery of said grinding mechanism and in contact with said mixing mechanism, for the purpose specified.

2. In combination, millstones A B, an inclosing chamber, F G, mixing-arms H H, and liquid-supplying pipes K K, opening beneath said stones, as and for the purpose specified.

In testimony whereof I have hereunto set my hand this the 26th day of July, A. D. 1882.

GEORGE T. LEWIS.

In presence of—
J. L. MONTGOMERY,
H. R. SHULTZ.